(12) United States Patent
Liao

(10) Patent No.: US 10,698,444 B2
(45) Date of Patent: Jun. 30, 2020

(54) DOCKING STATION HAVING ADAPTER FUNCTION AND END-USER DEVICE ACCESSORY

(71) Applicant: Guangdong Gopod Group Co., Ltd., Shenzhen/Guangdong (CN)

(72) Inventor: Zhuowen Liao, Shenzhen (CN)

(73) Assignee: GUANGDONG GOPOD GROUP HOLDING CO., LTD., Shenzhen (CN)

( * ) Notice: Subject to any disclaimer, the term of this patent is extended or adjusted under 35 U.S.C. 154(b) by 0 days.

(21) Appl. No.: 16/288,215

(22) Filed: Feb. 28, 2019

(65) Prior Publication Data
US 2019/0196545 A1 Jun. 27, 2019

Related U.S. Application Data

(63) Continuation of application No. PCT/CN2017/093573, filed on Jul. 19, 2017.

(30) Foreign Application Priority Data

Apr. 25, 2017 (CN) .......................... 2017 1 0277530

(51) Int. Cl.
*G06F 1/16* (2006.01)
*G06F 1/26* (2006.01)
(Continued)

(52) U.S. Cl.
CPC .......... *G06F 1/1632* (2013.01); *G06F 1/1656* (2013.01); *G06F 1/263* (2013.01);
(Continued)

(58) Field of Classification Search
CPC ...... G06F 1/1632; G06F 1/1656; G06F 1/263; H02J 7/0018; H02J 7/04; H02J 7/045; H02M 7/003
(Continued)

(56) References Cited

U.S. PATENT DOCUMENTS 5,946,617 A * 8/1999 Portaro .................... H04B 7/26
                                                   379/413
6,253,329 B1 * 6/2001 Kang ...................... G06F 1/266
                                                   713/300
(Continued)

FOREIGN PATENT DOCUMENTS

CN       202177853 U    3/2012
CN       205334304 U    6/2016
CN       205353859 U    6/2016

OTHER PUBLICATIONS

USB Power Delivery Specification Revision 3.0 Jan. 12, 2017 (Year: 2017).*
(Continued)

*Primary Examiner* — Paul R. Myers
(74) *Attorney, Agent, or Firm* — Dorsey & Whitney LLP

(57) ABSTRACT

A docking station having adaptor function contains: an AC-DC conversion module, a charging module, a control module, and at least two interface modules. When an AC power source outputs AC power into the AC-DC conversion module, the AC-DC conversion module outputs two DC powers to the charging module and the control module according to the AC power. The control module is enabled to operate according to the first DC power. And, according to the second DC power, the control module controls the power charging module to charge each target end-user devices being connected to a corresponding interface module. When interface modules respectively connect to target end-user devices, the control module controls the signal transmission sequence of interface modules to provide data transmission paths amongst the end-user devices via the interface modules. The docking station also serves as an accessory for supplying electric power to an end-user device for endurance use.

19 Claims, 6 Drawing Sheets

(51) Int. Cl.
  *H02M 7/00* (2006.01)
  *H02J 7/00* (2006.01)
  *H02J 7/04* (2006.01)
(52) U.S. Cl.
  CPC .............. *H02J 7/0018* (2013.01); *H02J 7/04* (2013.01); *H02J 7/045* (2013.01); *H02M 7/003* (2013.01)
(58) Field of Classification Search
  USPC .................................................. 710/106, 303
  See application file for complete search history.

(56) References Cited

U.S. PATENT DOCUMENTS

| | | | | |
|---|---|---|---|---|
| 7,480,753 | B2 * | 1/2009 | Bohm | .................. G06F 13/4022 710/104 |
| 9,560,217 | B2 * | 1/2017 | Song | .................... H04M 19/08 |
| 2002/0118223 | A1 | 8/2002 | Steichen et al. | |
| 2004/0257761 | A1 | 12/2004 | Park | |
| 2007/0005840 | A1 * | 1/2007 | Cheng | ................... G06F 1/1632 710/62 |
| 2012/0049794 | A1 * | 3/2012 | Han | ........................ B60L 1/003 320/109 |
| 2017/0046289 | A1 * | 2/2017 | Hundal | ............... G06F 13/4022 |

OTHER PUBLICATIONS

Written Opinion of the International Searching Authority for PCT/CN2017/093573 (Chinese Version) dated Jan. 24, 2018.
Written Opinion of the International Searching Authority for PCT/CN2017/093573 (English Translation) dated Jan. 24, 2018.
International Search Report for PCT/CN2017/093573 (English Version) dated Jan. 24, 2018.

\* cited by examiner

DOCKING STATION HAVING ADAPTER FUNCTION AND END-USER DEVICE ACCESSORY

CROSS-REFERENCE TO RELATED APPLICATIONS

This application is a continued application of PCT/CN2017/093573 filed Jul. 19, 2017, which claims priority to China Application No. 201710277530.4 filed Apr. 25, 2017, the disclosures of which are both hereby incorporated by reference in their entirety.

FIELD

The invention generally relates to electronic technology field and, more particularly, to a docking station having adapter function and end-user device accessory.

BACKGROUND

With the popularization of end-user devices (e.g. mobile phones, computers and tablets, etc.), the degree of convenience in people's life and work environment has become higher and higher. Data communications between different kinds of end-user devices are achieved by connecting data lines or docking stations. Prior art docking stations can provide different data ports for end-user devices to satisfy data communications between different kinds of end-user devices. However, the prior art docking stations can only provide data link to end-user devices and require the end-user devices to supply their own electric power. Therefore, when using the prior art docking stations for data communications, it easily causes end-user devices to consume electricity quickly thereby reducing the end-user devices' endurance in use.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

According to an example embodiment of the invention, a docking station having adapter function and end-user accessory is used for solving the problem of end-user devices' relatively fast electric power consumption. When the prior art docking stations are used, the end-user devices need to supply their own electric power.

According of one aspect of the invention, a docking station having adapter function is used for connecting between AC power source and at least one target end-user device. The docking station provides electric power charging to the at least one target end-user device. Further, the docketing station provides data transmission routes for connecting amongst multiple target end-user devices. The docking station contains: an AC/DC conversion module, a power charging module, a control module, and at least two interface modules.

When the AC power source sends AC power into the AC/DC conversion module, the AC/DC conversion module outputs two separate DC powers into the power charging module and the control module based on the received AC power. The control module is enabled to operate according to the first DC power. And, according to the second DC power, the control module controls the power charging module to charge each target end-user device that is connected to a corresponding interface module.

When the interface modules respectively connect to the target end-user devices, the control module controls signal transmission sequence of each interface module to enable data transmission amongst the target end-user devices connected thereon.

According to anther aspect of the invention, an end-user device accessory is used to connect the end-user devices, for supplying the end-user devices' electric power source, or for providing data transmission paths for the end-user devices. The end-user device accessory includes the docking station having adapter function as described above.

The docking station having adapter function is used for connecting AC power source and target end-user devices for charging the target end-user devices; or for providing data transmission paths amongst multiple target end-user devices connected thereon. The docking station contains: an AC/DC conversion module, a power charging module, a control module, and at least two interface modules. When AC power source outputs AC power into the AC/DC conversion module, the AC/DC conversion module outputs two separate DC powers into the power charging module and the control module according to the AC power. The control module is enabled to operate according to the first DC power. And, according to the second DC power, the control module controls the power charging module to charge each target end-user devices that is connected to a corresponding interface module.

When the interface modules respectively connect to the target end-user devices, the control module controls signal transmission sequence of each interface module to enable data transmission amongst the target end-user devices via the interface modules. When the docking station is used, it also acts as an adapter to supply electric power to the end-user device to ensure the end-user device works continuously.

BRIEF DESCRIPTION OF THE DRAWINGS

These and other features, aspects, and advantages of the invention will be better understood with regard to the following description, appended claims, and accompanying drawings as follows:

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

According to an example embodiment, a docking station is to provide adapter function and is also an end-user device accessory. The object of the invention is to solve the problem of end-user device's relatively fast electric power consumption due to the need of end-user device to supply its own electric power to the docking station.

The following detailed descriptions are for example embodiments.

Figure 1:
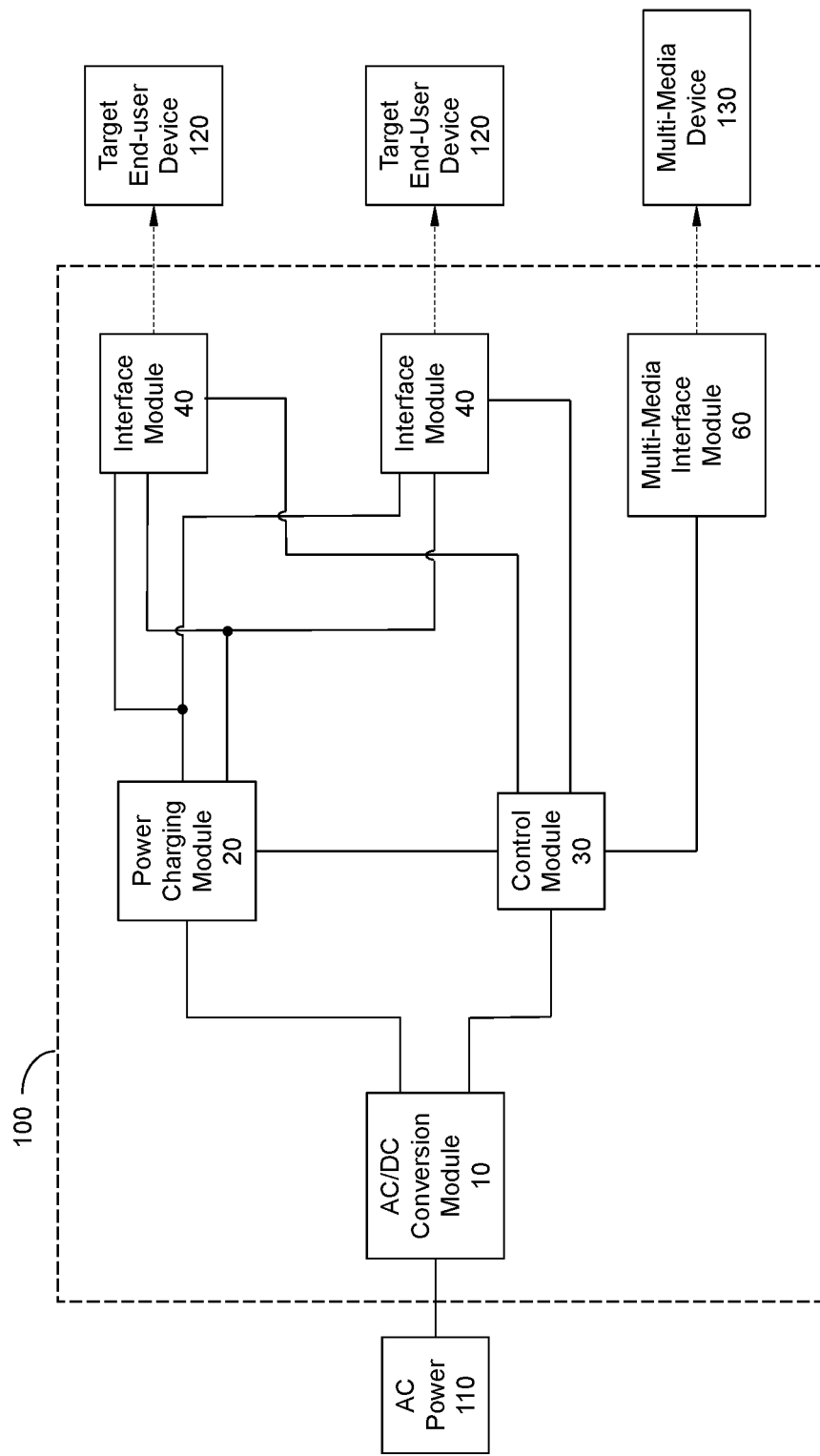
FIG. 1 is a schematic diagram of an example docking station having adapter function in accordance with one embodiment of the invention.

FIG. 1 is a schematic diagram of an example docking station having adapter function. For illustration simplicity, only salient parts are shown.

As shown in FIG. 1, an example docking station having adapter function 100 is used for connecting between AC power source 110 and target end-user devices 120 to charge the target end-user devices 120, or for providing data transmission paths amongst multiple target end-user devices 120 connected thereon. The docking station having adapter function 100 contains: an AC/DC conversion module 10, a power charging module 20, a control module 30, and at least two interface modules 40.

When the AC power source 110 outputs AC power into the AC/DC conversion module 10, the AC/DC conversion module 10 outputs two separate DC powers into the power charging module 20 and the control module 30 according to the AC power. The control module 30 is enabled to operate according to the first DC power. And, according to the second DC power, the control module 30 controls the power charging module 20 to charge each target end-user device 120 that is connected to a corresponding interface module 40.

When the interface modules 40 respectively connect to the target end-user devices 120, the control module 30 controls signal transmission sequence of each interface module 40 to enable data transmission amongst the target end-user devices 120 connected thereon.

According to one embodiment, target end-user devices 120 include, but are not limited to, computers, mobile phones, tablets.

It is understood that when AC power source 110 outputs AC power into the AC/DC conversion module 10 while each interface module 40 individually connects to a target end-user device 120, the docking station 100, based on AC power, charges each of the target end-user devices 120. At the same time, it serves as the data transmission path amongst the multiple target end-user devices 120.

As shown in FIG. 1, input port of AC/DC conversion module 10 connects to AC power source 110. The first output port of the AC/DC conversion module 10 connects to the input port of power charging module 20. The second output port of AC/DC conversion module 10 connects to the input port of control module 30. The trigger signal output port of control module 30 connects to the trigger signal port of power charging module 20. The DC power input port of each of the interface modules 40 connects to the DC output port of power charging module 20. The device detection port of each of the interface modules 40 connects to the identification signal sampling port of power charging module 20. Multiple communication ports of control module 30 respectively connect to the communication port of each interface module 40.

Furthermore, as shown in FIG. 1, the docking station 100 also includes a multimedia interface module 60 for connecting multimedia device 130.

When the multimedia interface module 60 connects to the multimedia device 130 and each interface module 40 connects to corresponding target end-user device 120, the docking station 100 sends a target signal it receives to the multimedia device 130 for interpretation. The target signal is sent by a target end-user device 120 connected to the interface module 40.

Furthermore, signal input port of the multimedia interface module 60 connects to video signal output port of the control module 30.

According to one embodiment, the multimedia interface module 60 includes, but is not limited to, VGA (Video Graphic Array) port, DVI (Digital Video Interface) port, HDMI (High-Definition Multimedia Interface) port, DP (DisplayPort) port.

Figure 2:
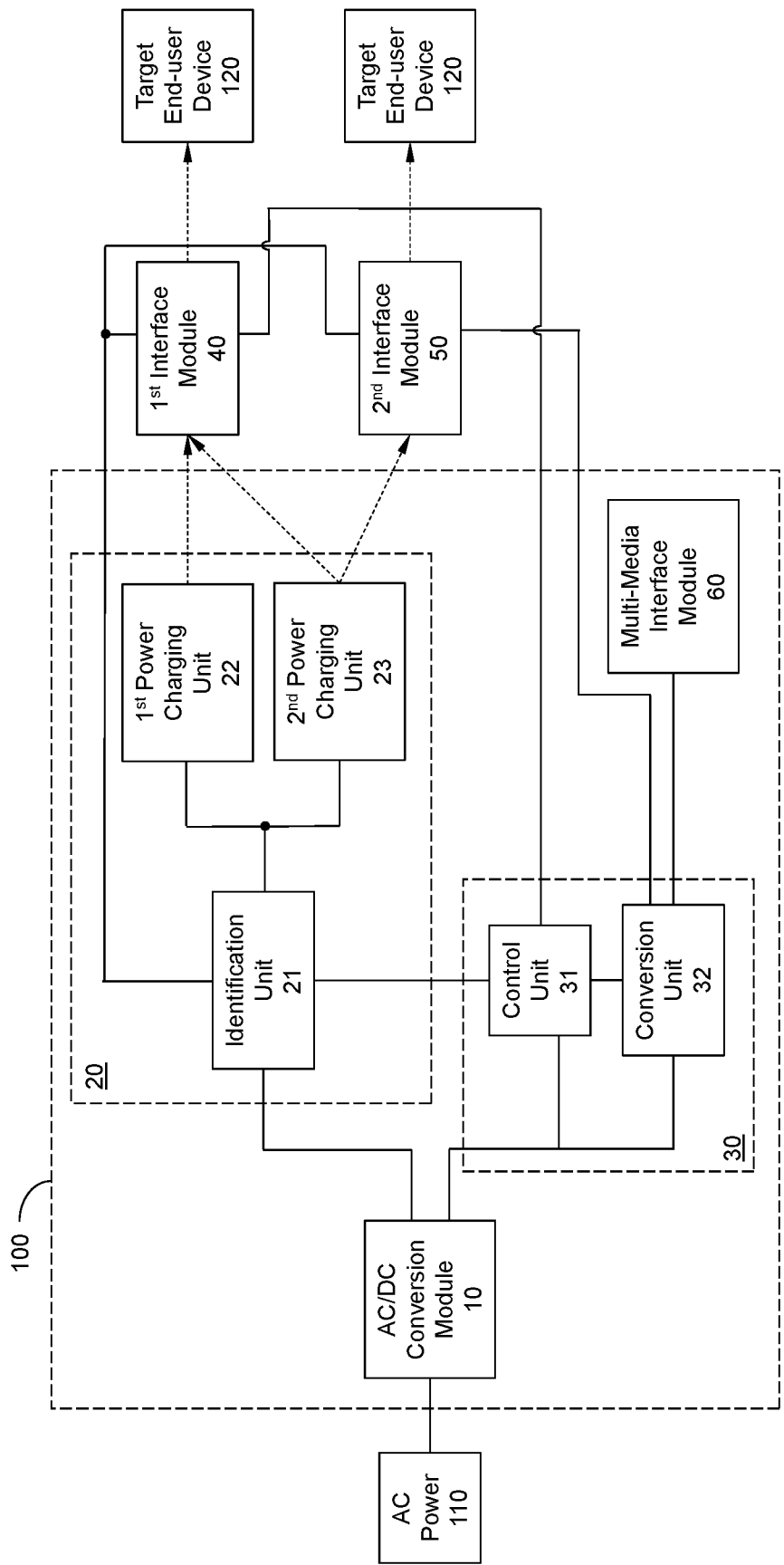
FIG. 2 is a detailed schematic diagram of the example docking station having adapter function of FIG. 1 in accordance with one embodiment of the invention.

FIG. 2 shows a detailed schematic diagram of the example docking station having adapter function 100. As shown in FIG. 2, the example docking station 100 includes first interface module 40 and second interface module 50. Power charging module 20 includes: identification unit 21, first power charging unit 22, and second power charging unit 23.

The control port of the first power charging unit 22 and the control port of the second power charging unit 23 are connected together to the output port of the identification unit 21. The power input port of the identification unit 21 is the input port of the power charging module 20. The power charging output port of the first power charging unit 22 and the power charging output port of the second power charging unit 23 form the DC output port of the power charging module 20. The signal sampling port of the identification unit 21 is the identification signal sampling port of the power charging module 20.

When the AC power source 110 outputs AC power into the AC/DC conversion module 10, the control module 30 sends a trigger signal to the identification unit 21 causing the identification unit 21 to operate. If the identification unit 21 detects the first interface module 40 being connected to a particular one of the target end-user devices 120, the identification unit 21 directs the first power charging unit 22 to charge the particular one of the target end-user devices 120. If the identification unit 21 detects the first interface module 40 and the second interface module 50 being respectively connected to two target end-user devices 120, the identification unit 21 directs the second power charging unit 23 to charge both target end-user devices 120 via the first interface module 40 and the second interface module 50, respectively.

As shown in FIG. 2, control module 30 includes a control unit 31 and a conversion unit 32.

The power input port of the control unit 31 and the power input port of the conversion unit 32 form the power input port for the control module 30. The first signal port of the control unit 31 is the first communication port of the control module 30. The first communication port of the control module 30 connects to the first interface module 40. The second communication port of the control unit 31 connects to the first communication port of the conversion unit 32. The second communication port of the conversion unit 32 is the second communication port of the control module 30. The second communication port of the control module 30 is used for connecting with the second interface module 50. The third communication port of the conversion unit 32 is the video signal output port of the control module 30.

Figure 3:
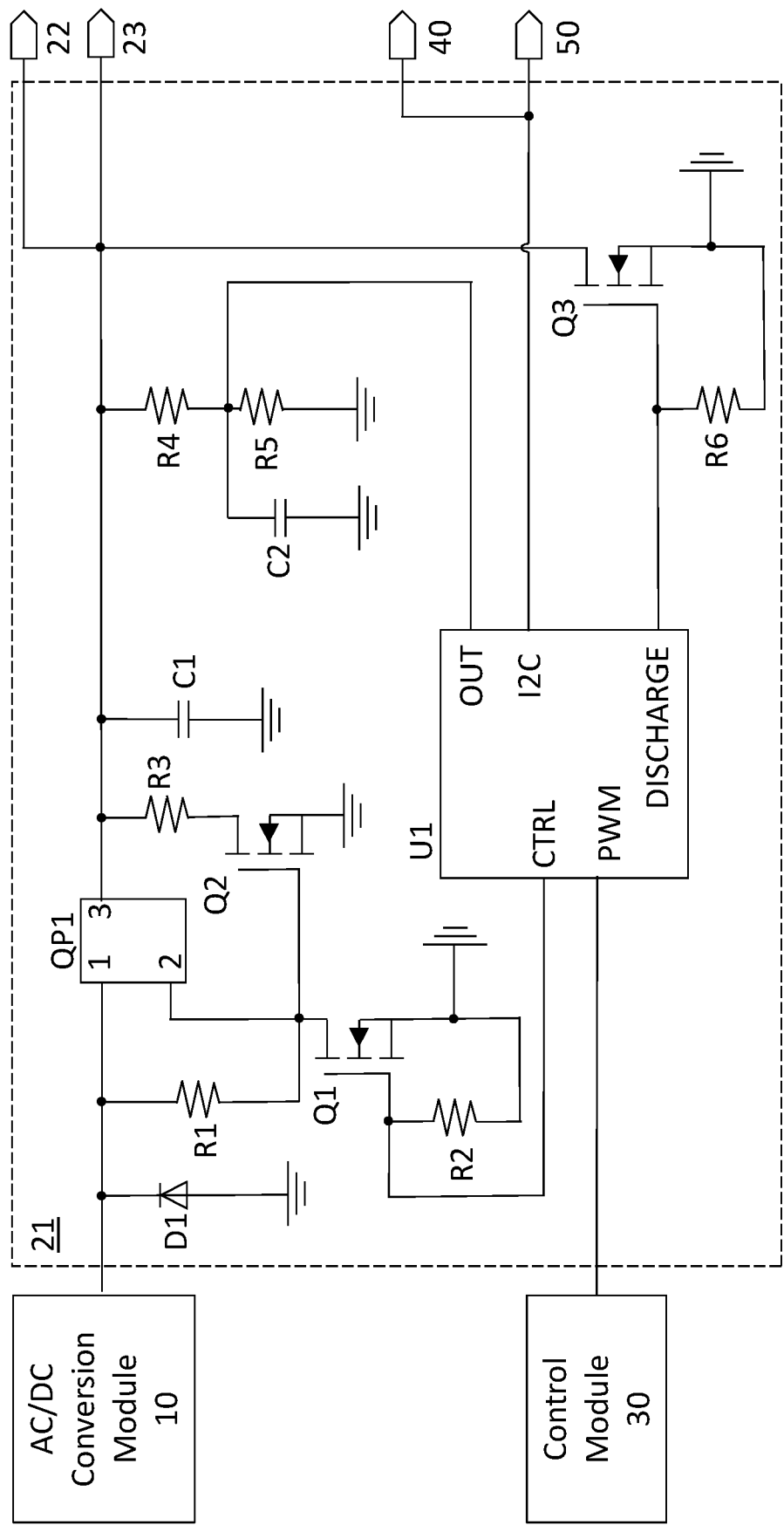
FIG. 3 is a circuit diagram of the identification unit of the example docking station having adapter function in accordance with one embodiment of the invention.

FIG. 3 shows a circuit diagram of the example docking station having adapter function 100 in accordance with an embodiment of the invention. As shown in FIG. 3, the identification unit 21 contains: first chip U1, first diode D1, first relay QP1, first resistor R1, second resistor R2, third resistor R3, fourth resistor R4, fifth resistor R5, sixth resistor R6, first switching tube Q1, second switching tube Q2, third switching tube Q3, first capacitor C1, and second capacitor C2.

The first port of the first diode D1 and the first port of the first resistor R1 together connect to the first port of the first relay QP1 forming the first node. The first node is the power input port for the identification unit 21. The second port of the first diode D1 is grounded. The second port of the first resistor R1 and the second port of the first relay QP1 together connect to the high potential end of the first switching tube Q1. The low potential end of first switching tube Q1 is grounded. The control port of the first switching tube Q1 and the first port of the second resistor R2 together connect to the power control port CTRL of the first chip U1. The trigger signal input port PWM of the first chip U1 is the trigger signal port of the identification unit 21. The second port of the second resistor R2 is grounded. The third port of the first relay QP1 and the first port of the third resistor R3 together connect to the first port of the first capacitor C1. The second port of the third resistor R3 connects the high potential end of the second switching tube Q2. The control port of the second switching tube Q2 connects to the high potential end of the first switching tube Q1. The low potential end of the second switching tube Q2 is grounded. The second port of the first capacitor C1 is grounded. The first port of the first capacitor C1 connects to the first port of the fourth resistor R4. The second port of the fourth resistor R4 and the first port of the fifth resistor R5 together connect to the first port of the second capacitor C2. The second port of the fifth resistor R5 and the second port of the second capacitor C2 together are grounded. The first switching controller OUT of the first chip U1 connects to the second port of the fourth resistor R4. The second switching control port DISCHARGE and the first port of the sixth resistor R6 together connect to the control port of the third switching tube Q3. The second port of the sixth resistor R6 is grounded. The high potential end of the third switching tube Q3 connects to the first port of the fourth resistor R4, and form a second node. The second node is the output port of the identification unit 21. The low potential end of the third switching tube Q3 is grounded. The signal sampling port I2C of the first chip U1 is the signal sampling port of the identification unit 21.

Figure 4:
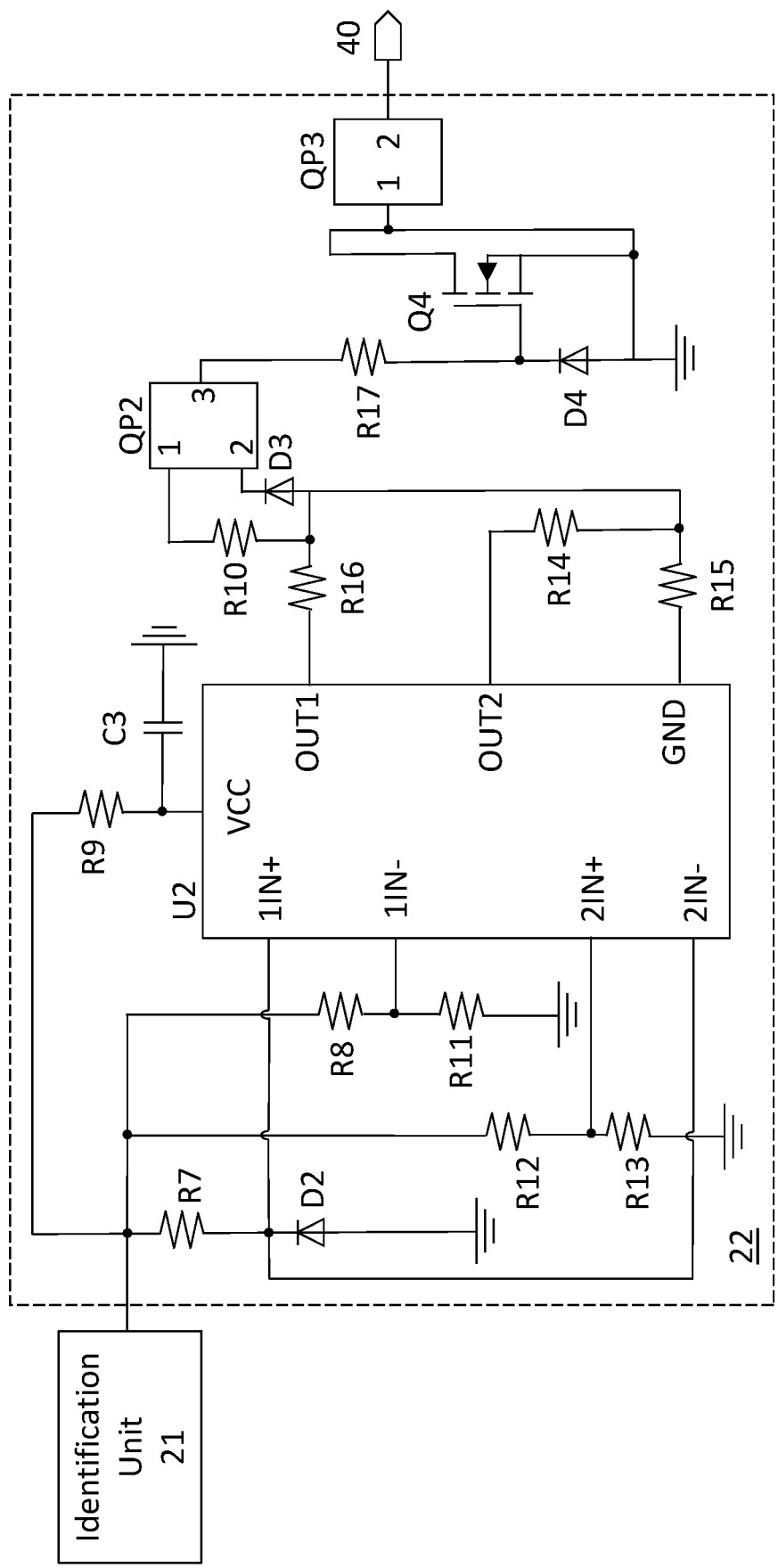
FIG. 4 is a circuit diagram of the first power charging unit of the example docking station having adapter function in accordance with one embodiment of the invention.

FIG. 4 is a circuit diagram of the first power charging unit 22 of the example docking station having adapter function 100 in accordance with an embodiment of the invention. As shown in FIG. 4, the first power charging unit 22 contains: second chip U2, second relay QP2, third relay QP3, third capacitor C3, the second diode D2, third diode D3, fourth diode D4, fourth switching tube Q4, seventh resistor R7, eighth resistor R8, the ninth resistor R9, tenth resistor R10, eleventh resistor R11, twelfth resistor R12, thirteenth resistor R13, fourteenth resistor R14, fifteenth resistor R15, sixteenth resistor R16, and seventeenth resistor R17.

The first port of the seventh resistor R7 and the first port of the eighth resistor R8 together connect to the first port of the ninth resistor R9. The second port of the ninth resistor R9 and the first port of the third capacitor C3 together connect to power input port of the second chip U2. The second port of the third capacitor C3 is grounded. The first port of the seventh resistor R7 is the control port of the first power charging unit 22. The second port of the seventh resistor R7 and the first port of the second diode D2 together connect to the first input port 1IN+ of the second chip U2. The second port of the second diode D2 is grounded. The second port of the eighth resistor R8 and the first port of the eleventh resistor R11 together connect to the second input port 1IN− of the second chip U2. The second port of the eleventh resistor R11 is grounded. The first port of the twelfth resistor R12 connects to the first port of the eighth resistor R8. The second port of the twelfth resistor R12 and the first port of the thirteenth resistor R13 together connect to the third input port 2IN+ of the second chip U2. The second port of the thirteenth resistor R13 is grounded. The fourth input port 2IN− of the second chip U2 connects to the second port of the seventh resistor R7. The first output port OUT1 of the second chip U2 connects to the first port of the sixteenth resistor R16. The second port of the sixteenth resistor R16 and the first port of the tenth resistor R10 together connect to the first port of the third diode D3. The second port of the tenth resistor R10 connects to the first port of the second relay QP2. The second port of the third diode D3 connects to the second port of the second relay QP2. The second output port OUT2 of the second chip U2 connects to the first port of the fourteenth resistor R14. The second port of the fourteenth resistor R14 and the first port of the third diode D3 together connect to the first port of the fifteenth resistor R15. The second port of the fifteenth resistor R15 connects to the ground wire end GND of the second chip U2. The first port of the seventeenth resistor R17 and the low potential end of the fourth switching tube Q4 together connect to the third port of the second relay QP2. The second port of the seventeenth resistor R17 and the first port of the fourth diode D4 together connect to the control port of the fourth switching tube Q4. The second port of the fourth diode Q4 is grounded. The high potential end of the fourth switching tube Q4 is grounded. The high potential end of the fourth switching tube Q4 and the low potential end of the fourth switching tube Q4 together connect to the first port of the third relay QP3. The second port of the third relay QP3 is the power charging output port for the first power charging unit 22.

Figure 5:
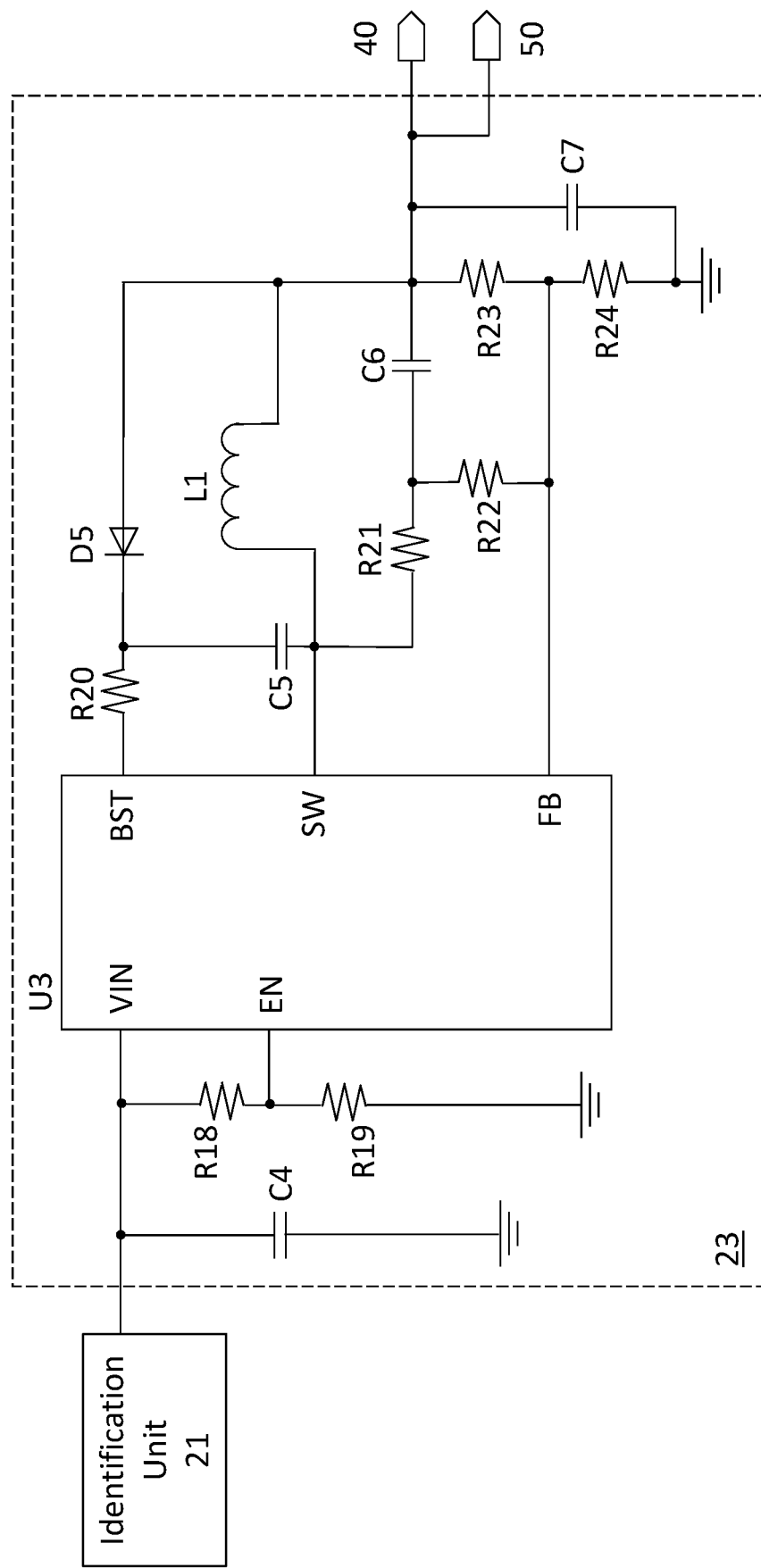
FIG. 5 is a circuit diagram of the second power charging unit of the example docking station having adapter function in accordance with one embodiment of the invention.

FIG. 5 is a circuit diagram of the second power charging unit 22 of the example docking station having adapter function 100 in accordance with an embodiment of the invention. As shown in FIG. 5, the power charging unit 23 contains: third chip U3, eighteenth resistor R18, nineteenth resistor R19, twentieth resistor R20, twenty-first resistor R21, twenty-second resistor R22, twenty-third resistor R23, twenty-fourth resistor R24, fifth diode D5, first inductor L1, fourth capacitor C4, fifth capacitor C5, sixth capacitor C6, and seventh capacitor C7.

The first port of the fourth capacitor C4 and the first port of the eighteenth resistor R18 together connect to the DC power input port VIN of the third chip U3; and that forms the fourth node. The fourth node is the control port of the second power charging unit 23. The second port of the fourth capacitor C4 is grounded. The second port of the eighteenth resistor R18 and the first port of the nineteenth resistor R19 together connect to the enabling terminal EN of the third chip U3. The second port of the nineteenth resistor R19 is grounded. The boost control port BST of the third chip U3 connects to the first port of the twentieth resistor R20. The second port of the twentieth resistor R20 and the first port of the fifth capacitor C5 together connect to the first port of the fifth diode D5. The second port of the fifth capacitor C5 and the first port of the first inductor L1 together connect to the switching node port SW of the third chip U3. The second port of the fifth diode D5 and the first port of the twenty-third resistor R23 together connect to the second port of the first inductor L1. The first port of the twenty-first resistor R21 connects to the first port of the first inductor L1. The second port of the twenty-first resistor R21 and the first port of the sixth capacitor together connect to the first port of the twenty-second resistor R22. The second port of the twenty-second resistor R22 connects to the feedback port FB of the third chip U3. The second port of the sixth capacitor C6 connects to the second port of the first inductor L1. The second port of the twenty-third resistor R23 and the first port of the twenty-fourth resistor R24 together connect to the second port of the twenty-second resistor R22. The second port of the twenty-fourth resistor R24 is grounded. The first port of the seventy capacitor C7 connects to the first port of the twenty-third resistor R23. The first port of the seventh capacitor C7 is the power charging output port for the second power charging unit 23. The second port of the seventh capacitor C7 is grounded.

Using FIG. 2 through FIG. 5, below is a detail explanation of the operation principles of the example docking station having adapter function 100.

As shown in FIG. 2, when AC power source 110 outputs AC power into the AC/DC conversion module 10, the control module 30 sends a trigger signal to the identification unit 21 causing the identification unit 21 to operate. As shown in FIG. 3, the control module 30 sends a trigger signal to the identification unit 21. That is, the control module 30 sends a trigger signal to the PWM port of the first chip U1 causing the first chip U1 to operate.

When the signal identification sampling port I2C of the first chip U1 detects that the first interface module 40 is connected to a target end-user device 120, the first chip U1 uses the electricity potential of a second node to control the first power charging unit 22 to charge the target end-user device 120. The second node is formed by connecting to the high potential end of the third switching tube Q3 with the first port of the fourth resistor R4.

When the signal sampling port I2C of the first chip U1 detects that the first interface module 40 and the second interface module 50 respectively connects to two target end-user devices 120, the first chip U1 uses the electricity potential of a second node to control the second power charging unit 23 to respectively charge the two target end-user devices 120 via the first interface module 40 and the second interface module 50. The second node is formed by connecting to the high potential end of the third switching tube Q3 with the first port of the fourth resistor R4.

It is emphasized that the first power charging unit 22 is a DC-DC conversion circuit. As shown in FIG. 4, when the signal identification sampling port I2C of the first chip U1 detects that the first interface module 40 is connected to the target end-user device 120, through the output port of the identification unit 21, it outputs the first DC power into the first power charging unit 22. In other words, the second node, which is formed by connecting the high potential end of the third switching tube Q3 and the first port of the fourth resistor R4, outputs the first DC power into the first power charging unit 22. The second chip U2 of the first power charging unit 22 along with peripheral circuits outputs the second DC power, based on the first DC power, to charge the target end-user device 120 that is connected to the first interface module 40.

As shown in FIG. 3 and FIG. 5, the third chip U3 of the second power charging unit 23 is a comparison chip. When the signal sampling port I2C of the first chip U1 detects that the first interface module 40 and the second interface module 50 respectively connect to two target end-user devices 120, the first chip U1 uses the electricity potential of the second node to control the second power charging unit 23 to charge the two target end-user devices 120 via the first interface module 40 and the second interface module 50, respectively. The second node is formed by connecting to the high potential end of the third switching tube Q3 with the first port of the fourth resistor R4.

During the process of the second power charging unit 23 separately charging the two target end-user devices 120 via the first interface module 40 and the second interface module 50, the feedback end (FB) of the third chip U3, through the twenty-second resistor R22, the twenty-third resistor R23, and the twenty-fourth resistor R24, checks the charging voltage or the charging current of the target end-user device 120. This forms a closed loop charging circuit.

Figure 6:
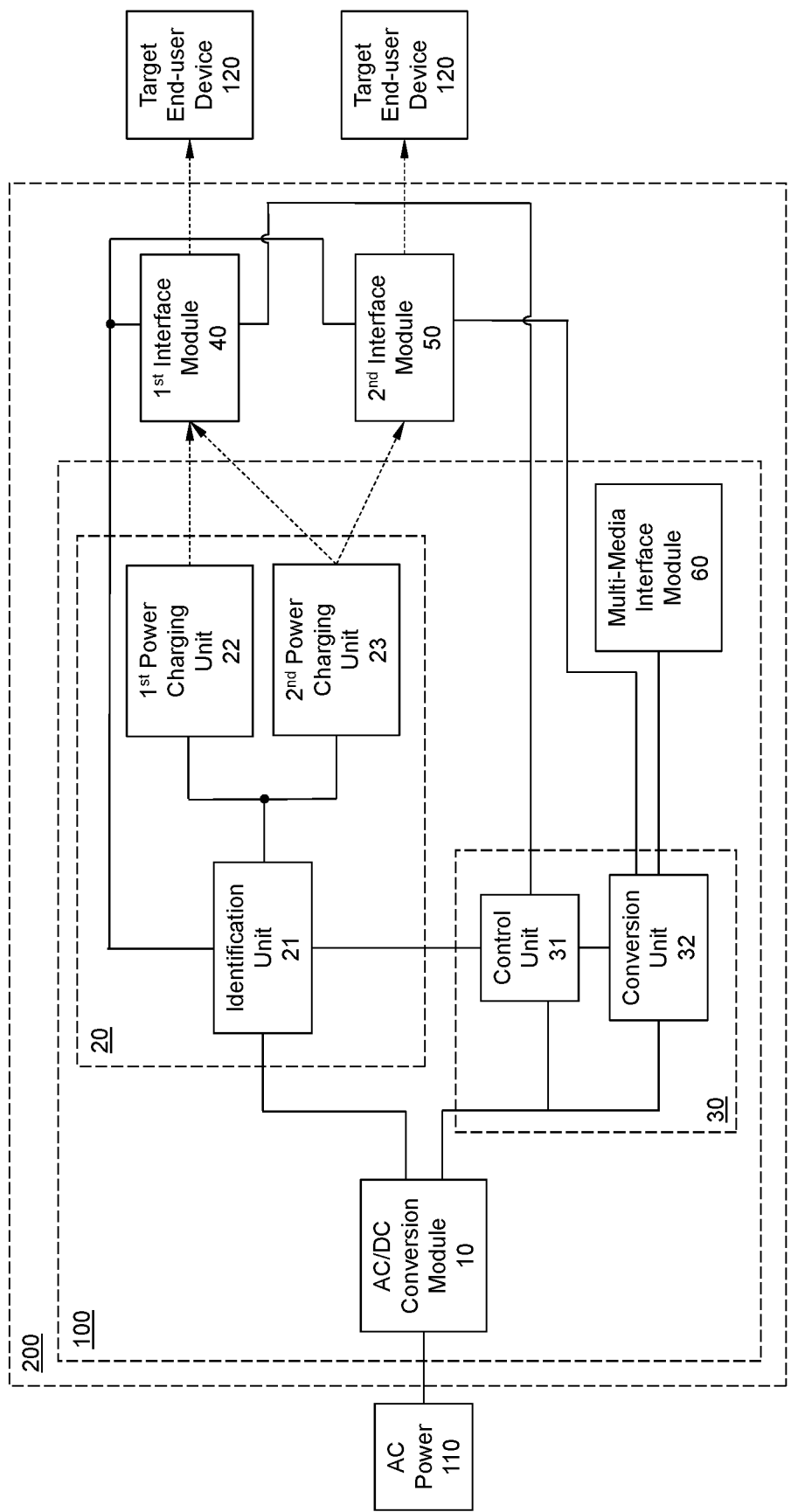
FIG. 6 is a schematic diagram of an end-user device accessory in accordance with one embodiment of the invention.

Furthermore, yet another object of the invention is to provide an end-user device accessory 200. As shown in FIG. 6, the example end-user device accessory 200 includes the example docking station having adapter function 100 as described.

Because operating principles of the example end-user device accessory 200 include those described for the example docking station having adaptor function 100, which has been described in detail, therefore, there is no need to repeat again.

The docking station having adapter function is used for connecting AC power source and target end-user devices either to charge the target end-user device or to provide data transmission paths amongst multiple target end-user devices connected thereon. The docking station contains: an AC/DC conversion module, a power charging module, a control module, and at least two interface modules. When AC power source outputs AC power into the AC/DC conversion module, the AC/DC conversion module, according to the AC power, outputs two separate DC powers into the power charging module and the control module. The control module is enabled to operate according to the first DC power. And, according to the second DC power, the control module controls the power charging module to charge each target end-user devices that is connected to a corresponding interface module. When each of the interface modules individually connects to target end-user devices, the control module controls signal transmission sequence of each interface module; enabling data transmission amongst target end-user devices via the interface module. It enables the docking station, at the same time it is being used, also the ability to provide electric power to the end-user device as an adapter; guaranteeing the end-user device to work continuously.

Although the invention has been described with reference to specific embodiments thereof, these embodiments are merely illustrative, and not restrictive of, the invention. Various modifications or changes to the specifically disclosed example embodiments will be suggested to persons skilled in the art. In summary, the scope of the invention should not be restricted to the specific example embodiments disclosed herein, and all modifications that are readily suggested to those of ordinary skill in the art should be included within the spirit and purview of this application and scope of the appended claims.

I claim:

1. A docking station having adapter function for connecting an Alternating Current (AC) power source and target end-user devices for charging the target end-user devices and for providing data transmission paths amongst the target end-user devices connected thereon, the docking station comprising:
an Alternating Current/Direct Current (AC/DC) conversion module;
a power charging module;
a control module; and
at least two interface modules;
wherein when the AC power source outputs AC power into the AC/DC conversion module, the AC/DC conversion module separately outputs first and second DC powers into the control module and the power charging module according to the AC power;
wherein the control module is enabled to operate according to the first DC power and, the control module is further configured to, according to the second DC power, control the power charging module to charge each of the target end-user devices that is connected to a corresponding interface module, and wherein the control module is further configured to control signal transmission sequence of each of the interface module to enable data transmission amongst the target end-user devices via the interface modules,
wherein an input port of the AD/DC conversion module connects to the AC power source; a first output port of the AC/DC conversion module connects to an input port of the power charging module; a second output port of the AC/DC conversion module connects to a power input port of the control module, a trigger signal output port of the control module connects to a trigger signal port of the power charging module; a DC power input port of each of the interface modules connects to a DC power output port of the power charging module; a device detection port of said each of the interface modules connects to an identification signal sampling port of the power charging module; a plurality of communication ports of the control module respectively connects to a communication port of said each the interface modules.

2. The docking station as described in claim 1, further comprises a multimedia interface module for connecting a multimedia device; wherein when the multimedia interface module connects to the multimedia device and the interface module connects to the target end-user device, a target signal received from one of the target end-user devices via the corresponding interface module is sent to the multimedia device for interpretation.

3. The docking station as described in claim 2, wherein a signal input port of the multimedia interface module connects to a video signal output port of the control module.

4. The docking station as described in claim 1, further comprises first and second interface modules, and the power charging module further comprises an identification unit, a first power charging unit, and a second power charging unit; wherein a control port of the first power charging unit and a control port of the second power charging unit together connect to an output port of the identification unit, a power input port of the identification unit is the input port of the power charging module, a power charging output port of the first power charging unit and a power charging output port of the second power charging unit form the DC power output port of the power charging module, a signal sampling port of the identification unit is the identification signal sampling port of the power charging module;
wherein when the AC power source outputs the AC power into the AC/DC conversion module, the control module sends a trigger signal to the identification unit causing the identification unit to operate;
if the identification unit detects the first interface module being connected to a particular one of the target end-user devices, the identification unit directs the first power charging unit to charge said particular one of the target end-user devices;
if the identification unit detects the first interface module and the second interface module being respectively connected to more than one of the target end-user devices, the identification unit directs the second power charging unit to charge said more than one of the target end-user devices through the first interface module and the second interface module.

5. The docking station as described in claim 4, wherein the control module further comprises a control unit and a conversion unit; wherein a power input port of the control unit and a power input port of the conversion unit form the power input port of the control module, a first signal port of the control unit is the first communication port of the control module configured for connecting the first interface module, a second signal port of the control unit connects to the first communication port of the conversion unit; a second communication port of the conversion unit is the second communication port of the control module being configured for connecting the second interface module, a third signal port of the conversion unit is the video signal output port of the control module.

6. The docking station as described in claim 4, wherein the identification unit further comprises a first chip, a first diode, a first relay, first, second, third, fourth, fifth and sixth resistors, first, second and third switching tubes, and first and the second capacitors; a first port of the first diode and a first port of the first resistor together connect to a first port of the first relay to form a first node as the power input port of the identification unit; a second port of the first diode is grounded; a second port of the first resistor and a second port of the first relay together connect to a high potential end of the first switching tube; a low potential end of the first switching tube is grounded; a control port of the first switching tube and a first port of the second resistor together connect to a power control port of the first chip; a trigger signal input port of the first chip is the trigger signal port of the identification unit; a second port of the second resistor is grounded; a third port of the first relay and a first port of the third resistor together connect to a first port of the first capacitor; a second port of the third resistor connects to a high potential end of the second switching tube; a control port of the second switching tube connects to the high potential end of the first switching tube; a low potential end of the second switching tube is grounded; a second port of the first capacitor is grounded; a first port of the first capacitor connects to a first port of the fourth resistor; a second port of the fourth resistor and a first port of the fifth resistor together connect to a first port of the second capacitor; a second port of the fifth resistor and a second port of the second capacitor together are grounded; a switching control port of the first chip and a first port of the sixth resistor together connect to a control port of the third switching tube; a second port of the sixth resistor is grounded; a high potential end of the third switching tube connects to a first port of the fourth resistor to form a second node as the output port of the identification unit; a low potential end of the third switching tube is grounded; and a signal sampling port of the first chip is the signal sample port of the identification unit.

7. The docking station as described in claim 4, wherein the first power charging unit further comprises a second chip, second and third relays, a third capacitor, second, third and fourth diodes, a fourth switching tube, seventh, eighth, ninth resistor, tenth, eleventh, twelfth, thirteenth, fourteenth, fifteenth, sixteenth and seventeenth resistors; a first port of the seventh resistor and a first port of the eighth resistor together connect to a first port of the ninth resistor; a second port of the ninth resistor and a first port of the third capacitor together connect to a power input port of the second chip; a second port of the third capacitor is grounded; a first port of the seventh resistor is the control port of the first power charging unit; a second port of the seventh resistor and a second port of the second diode together connect to a first input port of the second chip; a second port of the second diode is grounded; a second port of the eighth resistor and a first port of the eleventh resistor together connect to a second input port of the second chip; a second port of the eleventh resistor is grounded; a first port of the twelfth resistor connects to a first port of the eighth resistor; a second port of the twelfth resistor and a first port of the thirteenth resistor together connect to a third input port of the second chip; a second port of the thirteenth resistor is grounded; a fourth input port of the second chip connects to a second port of the seventh resistor; a first output port of the second chip connects to a first port of the sixteenth resistor; a second port of the sixteenth resistor and a first port of the seventeenth resistor together connect to a first port of the third diode; a second port of the tenth resistor connects to a first port of the second relay; a second port of the third diode connects to a second port of the second relay; a second output port of the second chip connects to a first port of the fourteenth resistor; a second port of the fourteenth resistor and a first port of the third diode together connect to a first port of the fifteenth resistor; a second port of the fifteenth resistor connects to a grounded end of the second chip; a first port of the seventeenth resistor and a low potential end of the fourth switching tube together connect to a third port of the second relay; a second port of the seventeenth resistor and a first port of the fourth diode together connect to a control port of the fourth switching tube; a second port of the fourth diode is grounded; a high potential end of the fourth switching tube is grounded; the high potential end of the fourth switching tube and a low potential end of the fourth switching tube together connect to a first port of the third relay; and a second port of the third relay is the power charging output port of the first power charging unit.

8. The docking station as described in claim 4, wherein the second power charging unit further comprises a third chip, an eighteenth resistor, a nineteenth resistor, a twentieth resistor, a twenty-first resistor, a twenty-second resistor, a twenty-third resistor, a twenty-fourth resistor, a fifth diode, a first inductor, a fourth capacitor, a fifth capacitor, a sixth capacitor, and a seventh capacitor; a first port of the fourth capacitor and a first port of the eighteenth resistor together connect to a DC power input port of the third chip to form a fourth node as the control port of the second power charging unit; a second port of the fourth capacitor is grounded; a second port of the eighteenth resistor and a first port of the nineteenth resistor together connect to an enabling terminal of the third chip; a second port of the nineteenth resistor is grounded; a boost control port of the third chip connects to a first port of the twentieth resistor; a second port of the twentieth resistor and a first port of the fifth capacitor together connect to a first port of the fifth diode; a second port of the fifth capacitor and a first port of the first inductor together connect to a switching node port of the third chip; a second port of the fifth diode and a first port of the twenty-third resistor together connect to a second port of the first inductor, a first port of the twenty-first resistor connects to a first port of the first inductor, a second port of the twenty-first resistor and a first port of the sixth capacitor together connect to a first port of the twenty-first resistor; a second port of the twenty-second resistor connects to a feedback port of the third chip; a second port of the sixth capacitor connects to a second port of the first inductor; a second port of the twenty-third resistor and a first port of the twenty-fourth resistor together connect to a second port of the twenty-second resistor; a second port of the twenty-fourth resistor is grounded; a first port of the seventh capacitor connects to a first port of the twenty-third resistor; the first port of the seventh capacitor is the power charging output port of the second power charging unit; and a second port of the seventh capacitor is grounded.

9. An end-user device accessory for charging end-user devices and for providing data communication paths for end-user devices connected thereon, the end-user device accessory comprising:
 a docking station having adaptor function for connecting an Alternating Current (AC) power source and target end-user devices, the docketing station comprises:
 an Alternating Current/Direct Current (AC/DC) conversion module; a power charging module;
 a control module; and
 at least two interface modules;
 wherein when the AC power source outputs AC power into the AC/DC conversion module, the AC/DC conversion module separately outputs first and second DC powers into the control module and the power charging module according to the AC power;
 wherein the control module is enabled to operate according to the first DC power and, the control module is further configured to, according to the second DC power, control the power charging module to charge each of the target end-user devices that is connected to a corresponding interface module, and wherein the control module is further configured to control signal transmission sequence of each of the interface module to enable data transmission amongst the target end-user devices via the interface modules;
 wherein an input port of the AD/DC conversion module connects to the AC power source; a first output port of the AC/DC conversion module connects to an input port of the power charging module; a second output port of the AC/DC conversion module connects to a power input port of the control module, a trigger signal output port of the control module connects to a trigger signal port of the power charging module; a DC power input port of each of the interface modules connects to a DC power output port of the power charging module; a device detection port of said each of the interface modules connects to an identification signal sampling port of the power charging module; a plurality of communication ports of the control module respectively connects to a communication port of said each the interface modules.

10. The end-user device accessory of claim 9, further comprises a multimedia interface module for connecting a multimedia device; wherein when the multimedia interface module connects to the multimedia device and the interface module connects to the target end-user device, a target signal received from one of the target end-user devices via the corresponding interface module is sent to the multimedia device for interpretation.

11. The end-user device accessory of claim 10, wherein a signal input port of the multimedia interface module connects to a video signal output port of the control module.

12. The end-user device accessory of claim 9, further comprises first and second interface modules, and the power charging module further comprises an identification unit, a first power charging unit, and a second power charging unit; wherein a control port of the first power charging unit and a control port of the second power charging unit together connect to an output port of the identification unit, a power input port of the identification unit is the input port of the power charging module, a power charging output port of the first power charging unit and a power charging output port of the second power charging unit form the DC power output port of the power charging module, a signal sampling port of the identification unit is the identification signal sampling port of the power charging module; wherein when the AC power source outputs the AC power into the AC/DC conversion module, the control module sends a trigger signal to the identification unit causing the identification unit to operate;
if the identification unit detects the first interface module being connected to a particular one of the target end-user devices, the identification unit directs the first power charging unit to charge said particular one of the target end-user devices;
if the identification unit detects the first interface module and the second interface module being respectively connected to more than one of the target end-user devices, the identification unit directs the second power charging unit to charge said more than one of the target end-user devices through the first interface module and the second interface module.

13. The end-user device accessory of claim 12, wherein the control module further comprises a control unit and a conversion unit; wherein a power input port of the control unit and a power input port of the conversion unit form the power input port of the control module, a first signal port of the control unit is the first communication port of the control module configured for connecting the first interface module, a second signal port of the control unit connects to the first communication port of the conversion unit; a second communication port of the conversion unit is the second communication port of the control module being configured for connecting the second interface module, a third signal port of the conversion unit is the video signal output port of the control module.

14. The end-user device accessory of claim 12, wherein the identification unit further comprises a first chip, a first diode, a first relay, first, second, third, fourth, fifth and sixth resistors, first, second and third switching tubes, and first and the second capacitors; a first port of the first diode and a first port of the first resistor together connect to a first port of the first relay to form a first node as the power input port of the identification unit; a second port of the first diode is grounded; a second port of the first resistor and a second port of the first relay together connect to a high potential end of the first switching tube; a low potential end of the first switching tube is grounded; a control port of the first switching tube and a first port of the second resistor together connect to a power control port of the first chip; a trigger signal input port of the first chip is the trigger signal port of the identification unit; a second port of the second resistor is grounded; a third port of the first relay and a first port of the third resistor together connect to a first port of the first capacitor; a second port of the third resistor connects to a high potential end of the second switching tube; a control port of the second switching tube connects to the high potential end of the first switching tube; a low potential end of the second switching tube is grounded; a second port of the first capacitor is grounded; a first port of the first capacitor connects to a first port of the fourth resistor; a second port of the fourth resistor and a first port of the fifth resistor together connect to a first port of the second capacitor; a second port of the fifth resistor and a second port of the second capacitor together are grounded; a switching control port of the first chip and a first port of the sixth resistor together connect to a control port of the third switching tube; a second port of the sixth resistor is grounded; a high potential end of the third switching tube connects to a first port of the fourth resistor to form a second node as the output port of the identification unit; a low potential end of the third switching tube is grounded; and a signal sampling port of the first chip is the signal sample port of the identification unit.

15. The end-user device accessory of claim 12, wherein the first power charging unit further comprises a second chip, second and third relays, a third capacitor, second, third and fourth diodes, a fourth switching tube, seventh, eighth, ninth resistor, tenth, eleventh, twelfth, thirteenth, fourteenth, fifteenth, sixteenth and seventeenth resistors; a first port of the seventh resistor and a first port of the eighth resistor together connect to a first port of the ninth resistor; a second port of the ninth resistor and a first port of the third capacitor together connect to a power input port of the second chip; a second port of the third capacitor is grounded; a first port of the seventh resistor is the control port of the first power charging unit; a second port of the seventh resistor and a second port of the second diode together connect to a first input port of the second chip; a second port of the second diode is grounded; a second port of the eighth resistor and a first port of the eleventh resistor together connect to a second input port of the second chip; a second port of the eleventh resistor is grounded; a first port of the twelfth resistor connects to a first port of the eighth resistor; a second port of the twelfth resistor and a first port of the thirteenth resistor together connect to a third input port of the second chip; a second port of the thirteenth resistor is grounded; a fourth input port of the second chip connects to a second port of the seventh resistor; a first output port of the second chip connects to a first port of the sixteenth resistor; a second port of the sixteenth resistor and a first port of the seventeenth resistor together connect to a first port of the third diode; a second port of the tenth resistor connects to a first port of the second relay; a second port of the third diode connects to a second port of the second relay; a second output port of the second chip connects to a first port of the fourteenth resistor; a second port of the fourteenth resistor and a first port of the third diode together connect to a first port of the fifteenth resistor; a second port of the fifteenth resistor connects to a grounded end of the second chip; a first port of the seventeenth resistor and a low potential end of the fourth switching tube together connect to a third port of the second relay; a second port of the seventeenth resistor and a first port of the fourth diode together connect to a control port of the fourth switching tube; a second port of the fourth diode is grounded; a high potential end of the fourth switching tube is grounded; the high potential end of the fourth switching tube and a low potential end of the fourth switching tube together connect to a first port of the third relay; and a second port of the third relay is the power charging output port of the first power charging unit.

16. The end-user device accessory of claim 12, wherein the second power charging unit further comprises a third chip, an eighteenth resistor, a nineteenth resistor, a twentieth resistor, a twenty-first resistor, a twenty-second resistor, a twenty-third resistor, a twenty-fourth resistor, a fifth diode, a first inductor, a fourth capacitor, a fifth capacitor, a sixth capacitor, and a seventh capacitor; a first port of the fourth capacitor and a first port of the eighteenth resistor together connect to a DC power input port of the third chip to form a fourth node as the control port of the second power charging unit; a second port of the fourth capacitor is grounded; a second port of the eighteenth resistor and a first port of the nineteenth resistor together connect to an enabling terminal of the third chip; a second port of the nineteenth resistor is grounded; a boost control port of the third chip connects to a first port of the twentieth resistor; a second port of the twentieth resistor and a first port of the fifth capacitor together connect to a first port of the fifth diode; a second port of the fifth capacitor and a first port of the first inductor together connect to a switching node port of the third chip; a second port of the fifth diode and a first port of the twenty-third resistor together connect to a second port of the first inductor, a first port of the twenty-first resistor connects to a first port of the first inductor, a second port of the twenty-first resistor and a first port of the sixth capacitor together connect to a first port of the twenty-first resistor; a second port of the twenty-second resistor connects to a feedback port of the third chip; a second port of the sixth capacitor connects to a second port of the first inductor; a second port of the twenty-third resistor and a first port of the twenty-fourth resistor together connect to a second port of the twenty-second resistor; a second port of the twenty-fourth resistor is grounded; a first port of the seventh capacitor connects to a first port of the twenty-third resistor; the first port of the seventh capacitor is the power charging output port of the second power charging unit; and a second port of the seventh capacitor is grounded.

17. An apparatus comprising:
at least first and second interfaces each configured to connect to a first target device and a second target device, respectively;
a power charging system comprising a trigger signal port, the power charging system is further coupled to the first and second interfaces and configured, when the first and second target devices are respectively connected to the first and second interfaces, to charge the first and second target devices through the first and second interfaces, respectively, responsive to a control signal from the trigger signal port;
a control circuit comprising a trigger output port coupled to the trigger signal port of the power charging system and configured to provide the control signal to the power charging system, the control circuit is further coupled to the first and second interfaces and configured to control signal transmission sequence of each of the first and second interface interfaces to enable data transmission between the first and second target devices when the first and second target devices are connected to the first and second interfaces, respectively; and
an Alternating Current/Direct Current (AC/DC) converter coupled to the power charging system and the control circuit, and configured to receive an AC power and provide a first and second DC powers to the power charging system and the control circuit, respectively;
wherein the control circuit is further configured, according to the second DC power, to control the power charging system to provide power to the first and second interfaces, and
wherein the power charging system further comprises an identification signal sample port, and wherein each of the first and second interfaces comprises a device detection port coupled to the identification signal sample port of the power charging system, and wherein at least two communication ports of the control circuit are coupled to a communication port of each the interfaces, respectively.

18. The apparatus of claim 17, wherein the power charging system further comprises:
a first power charging unit and a second power charging unit respectively coupled to the first and second interfaces; and
an identification unit coupled to the identification signal sampling port and the first and second interfaces, and configured to:
determine presence of the first or the second target devices;
if it is determined that the first interface is connected to a particular one of the first and second target devices, control the first power charging unit to charge the particular one of the first and second target devices;
if it is determined that the first interface and the second interface are connected to the first and second target devices respectively, control the second power charging unit to charge the first and second target devices through the first and second interfaces, respectively.

19. The apparatus of claim 17 further comprises a multimedia interface configured to connect to a multimedia device, wherein:
when the multimedia interface is connected to the multimedia device and at least one of the first and second interfaces is connected to a respective target device, the control circuit is further configured to send a target signal from the connected respective target device to the multimedia device for interpretation.

* * * * *